United States Patent [19]

Koike

[11] 3,911,395

[45] Oct. 7, 1975

[54] CODE ERROR MONITORING SYSTEM

[75] Inventor: Shin-Ichi Koike, Tokyo, Japan

[73] Assignee: Nippon Electric Company Limited, Tokyo, Japan

[22] Filed: Mar. 29, 1974

[21] Appl. No.: 456,409

[30] Foreign Application Priority Data

Mar. 31, 1973 Japan ............................... 48-37057

[52] U.S. Cl. ................ 340/146.1 AB; 340/146.1 A

[51] Int. Cl. ......................... H04l 1/10; G08c 25/00

[58] Field of Search .......... 340/146.1 AB, 146.1 A, 340/146.1 AV, 146.1 R

[56] References Cited

UNITED STATES PATENTS 3,573,729 4/1971 Gunn et al. ............... 340/146.1 AB

*Primary Examiner*—Eugene G. Botz
*Assistant Examiner*—R. Stephen Dildine, Jr.
*Attorney, Agent, or Firm*—Sughrue, Rothwell, Mion, Zinn & Macpeak

[57] ABSTRACT

In a multi-level digital transmission system, the transmitting station transmits two particular different-level code signals alternately in response to a particular one of N kinds of input information to be transmitted. Whenever the two particular code signals are received, the receiving station converts them into the one particular kind of input information. By determining whether the two particular code signals appear alternately at the receiving station, it is possible to monitor the presence of code errors introduced in a transmission channel.

19 Claims, 9 Drawing Figures

CODE ERROR MONITORING SYSTEM

BACKGROUND OF THE INVENTION

The present invention relates to a system for monitoring code errors produced in a transmission channel in a multilevel digital transmission system.

In multi-level digital transmission systems, in order to monitor code errors produced in the transmission channel, the transmitted signal should contain a redundancy. In this case, if the symbol transmission speed cannot be varied, then a method for adding the redundancy by increasing the information quantity per unit symbol is employed. In case of a multi-level transmission, the information quantity per unit symbol can be increased by increasing the kind of different pieces of information per unit symbol, that is, the number of the levels of a multi-level signal. This number corresponds to the number of amplitude levels in case of a multi-level transmission system based on pulse amplitude modulation (PAM) while to the number of phase positions in case of a multi-phase transmission system based on phase modulation. In the following, the invention will be described in connection with the multi-level PAM transmission system which is intuitively more comprehensible, but it is to be noted that the present invention is equally applicable to the multi-phase transmission system.

A conventional multi-level code error monitoring system employs, besides the digits for information transmission, a redundant digit for code error detection. On the other hand, a vacant level may be employed for detecting only insertion errors in the vacant level. The former system, however, decreases the transmission speed by employing the redundant digit. Also, the error detection rate of the latter system cannot be made high enough because only the insertion errors in the vacant level are monitored.

An object of the present invention is therefore to provide a code error monitoring system which excludes the redundant digit and can raise sufficiently the error detection rate.

SUMMARY OF THE INVENTION

In the multi-level PAM transmission system according to the invention, one redundancy level is added to N different levels capable of transmitting N pieces of information per unit symbol, and on the transmitter side a particular one of the N pieces of N input information is associated with particular two of the (N + 1) output levels, the two levels being transmitted alternately. On the receiver side, it is monitored to determine if said particular two of the (N + 1) levels appear alternately. If there should occur disappearance or insertion errors involving these two levels, the aforementioned condition of alternate appearance would not be satisfied, and therefore these errors could be detected. Assuming that the N pieces of input information would occur with an equal probability of 1/N, in the case of the multi-level PAM transmission system, the error detection rate can be raised to about 3/(N − 1), when N is not smaller than 4 and the error produced on the transmission path is sufficiently small (In case that N is 4 or 3, the above-mentioned error detection rate becomes nearly 100 percent). The explanation on the error detection rate will be detailed later.

DETAILED DESCRIPTION OF PREFERRED EMBODIMENTS

Figure 1A:
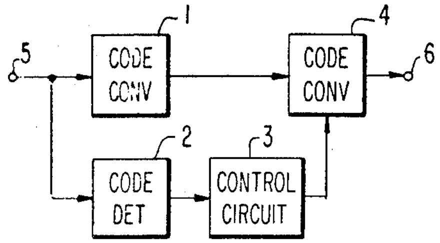
FIG. 1(*a*) shows in block form an encoder on the transmitter side according to the invention, and FIG. 1(*b*) illustrates a decoder and an error detector on the receiver side according to the invention.
Figure 1B:
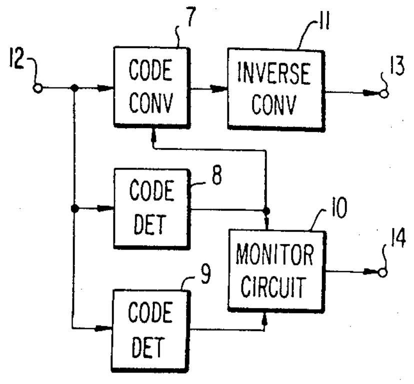

In FIG. 1(*a*), reference numeral 1 designates a first code converter for converting N input codes representing N pieces of input information, which are applied to an input terminal 5, into corresponding N intermediate codes; 2, a code detector for detecting a particular one of the N input codes; 3, a control circuit adapted to have its state switched in response to the output of the code detector 2; and 4, a second code converter responsive to the two kinds of outputs from the control circuit 3 for delivering alternately particular two codes whenever said particular one of the N input is detected. The particular two codes and the remaining N − 1 intermediate codes appear at output 6.

These output codes are converted to a multi-level signal which is transmitted to a receiving side. On the receiving side, the output codes are regenerated from the received multi-level signal by well-known level discriminator and encoder.

Now in FIG. 1(*b*), the (N + 1) codes regenerated on the receiving side appear at input 12. The particular two codes being transmitted alternately are detected by code detectors 8 and 9, respectively, and a monitoring circuit 10 serves to monitor whether or not said particular two codes appear alternately and to derive an error detection output at a terminal 14 if the condition of alternate appearance is not satisfied. On the other hand, reference numeral 7 designates a third code converter for counting the alternately transmitted two codes into the corresponding single intermediate code, and reference numeral 11 designates an inverse converter provided for the code converter 1 on the transmitter side. Thus, N output codes corresponding to the N input codes appear at output 13.

Figure 4:
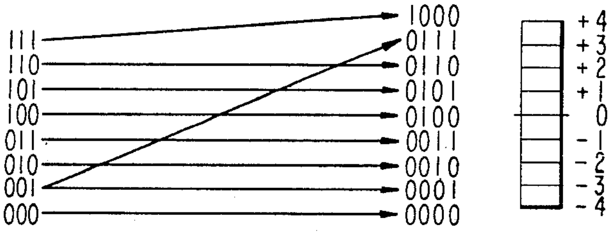
FIG. 4 shows a relationship between input and output codes in the case of FIGS. 2(*a*) and 2(*b*)
Figure 2A:
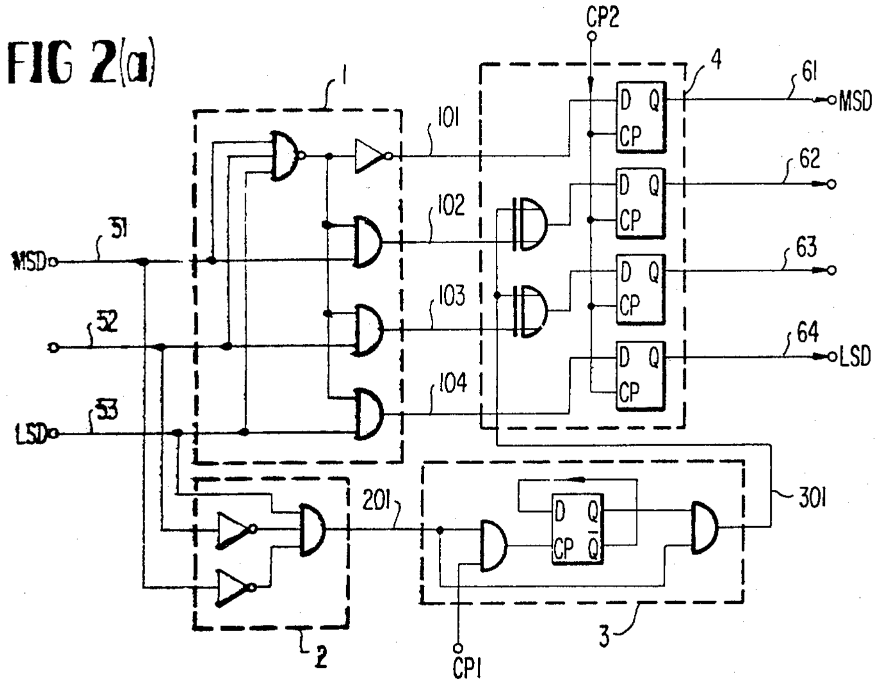
FIGS. 2(*a*) and 2(*b*) are circuit diagrams useful in explaining one prefered example of the present invention.
Figure 2B:
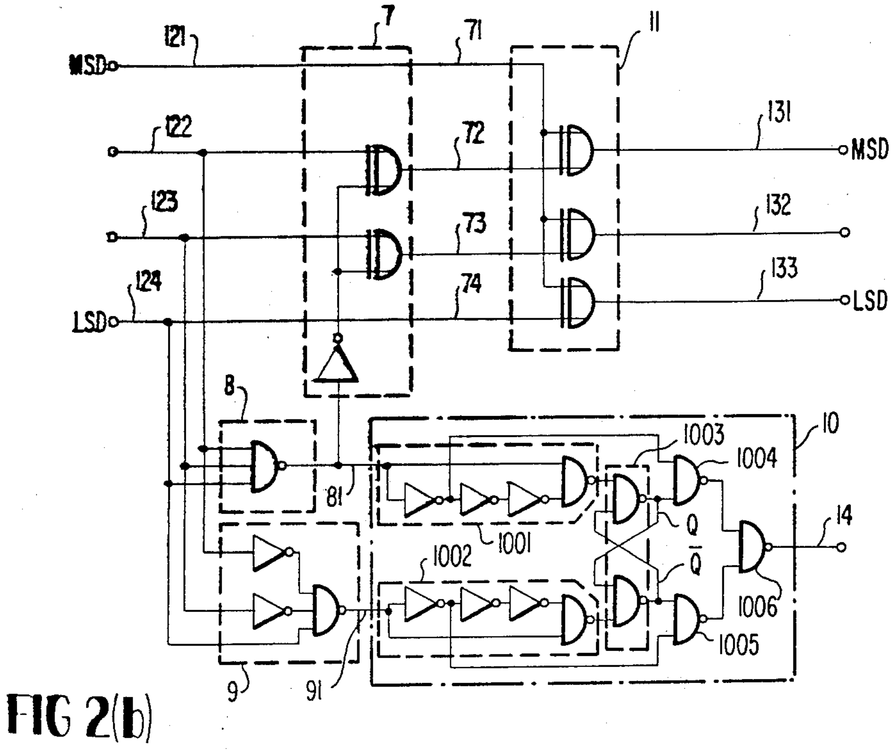
Figure 3B:
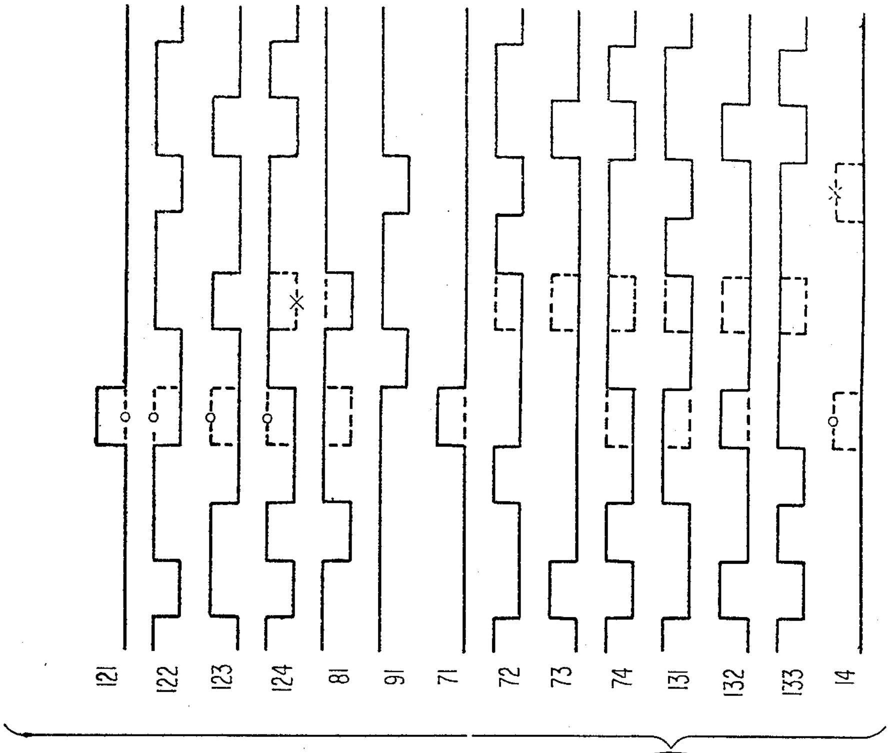
FIGS. 3(*a*) and 3(*b*) are waveform diagrams useful in explaining the operation of the devices of FIGS. 2(*a*) and 2(*b*)
Figure 3A:
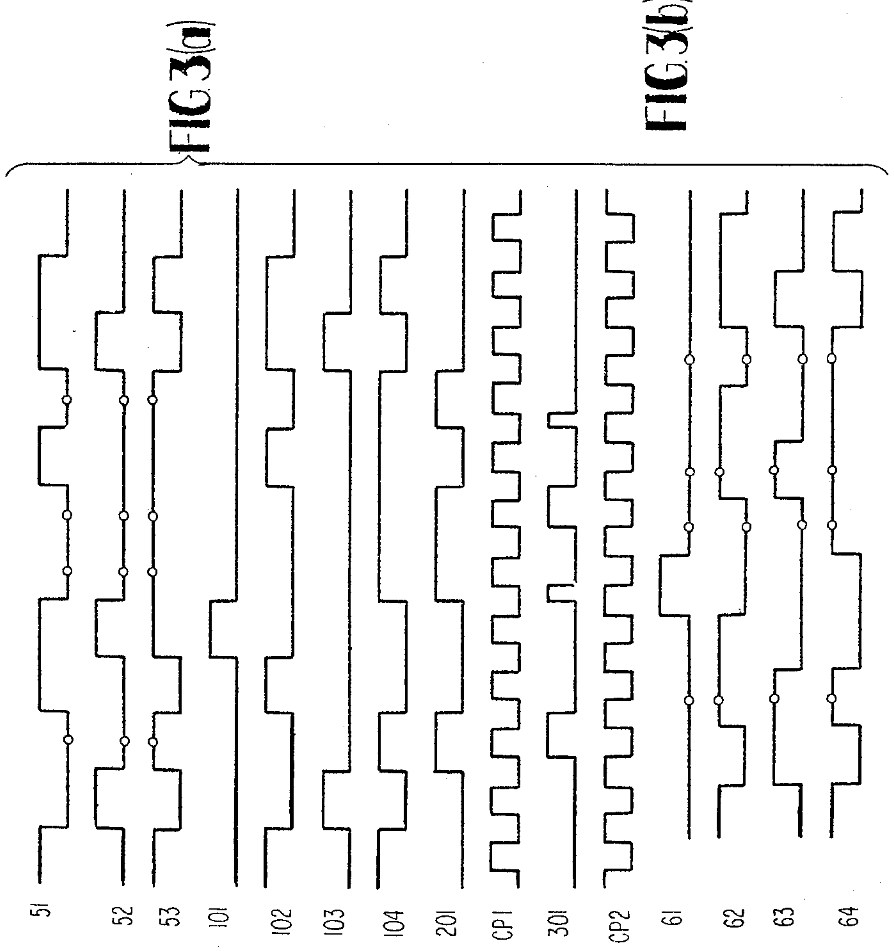

FIGS. 2(*a*) and 2(*b*) show concrete examples of circuits of FIGS. 1(*a*) and 1(*b*), respectively. FIGS. 3(*a*) and 3(*b*) show waveforms appearing at the points indicated by corresponding numerals in FIGS. 2(*a*) and 2(*b*), respectively. Now, referring to FIGS. 2(*a*) and 3(*a*), to terminals 51 – 53 are applied eight (N = 8) possible input codes which are represented by three digit parallel binary codes as shown in the left-hand side in FIG. 4. In the first code converter 1, including a NAND gate, an inverter and three AND gates, the eight input codes are converted into the eight intermediate codes as shown in the following table:

| input codes | intermediate codes |
|---|---|
| 111 | 1000 |
| 110 | 0110 |
| 101 | 0101 |
| 100 | 0100 |
| 011 | 0011 |
| 010 | 0010 |
| 001 | 0001 |
| 000 | 0000 |

The eight input codes are also applied to the code detector 2 which includes two inverters and an AND gate and delivers output "1" at the output 201 only when the input binary code is "001." The control circuit 3, including a D-type flip-flop and two AND gates, delivers outputs "0" and "1," alternately, at the output 301 whenever the output "1" of the code converter 2 appears. To this end, a first clock pulse $CP_1$ is employed. The second code converter 4, responsive to a second clock pulse $CP_2$, 8 the intermediate code "0001" to the output code "0111" whenever the output 301 assumes "1." Thus, the nine, (N + 1), output codes are obtained at the output terminals 61 – 64 in the form of four digit binary codes as shown in the right-hand side in FIG. 4, wherein the codes "0111" and "0001" appear alternately in response to the appearance of the input code "001"These output codes are converted to the multilevel signal whose levels are represented by +4, +3, +2, +1, 0, −1, −2, −3 and −4 as shown in the right-hand side in FIG. 4. The circle marks in FIG. 3(*a*) designates the case where the input and output codes are "001" and "0111" or "0001," respectively.

Now referring to FIGS. 2(*b*) and 3(*b*), among the regenerated nine (N + 1)parallel binary codes applied to 121 – 124, only the code "0111" is detected by the code detector 8 which delivers "0" as the output 81, and only the code "0001" is detected by the code converter 9 which delivers "0" as the output 91. The third code converter 7 converts the code "0111" to the code "0001" responsive to the output 81. The inverse converter 11 converts the codes appearing on wirings 71 – 74 into the three digit parallel binary codes as the outputs 131 – 133 as shown in the left-hand side in FIG. 4. In the monitoring circuit 10, negative trigger pulses are generated at the leading edges of the outputs 81 and 91 (changing time points from "0" to "1") by differentiating circuits 1001 and 1002, respectively, and applied to a flip-flop circuit 1003; inverted pulses of the outputs 81 and 91 are applied to NAND gates 1004 and 1005, respectively, together with the Q and Q outputs of the flip-flop circuit 1003; and the outputs of the gates 1004 and 1005 are applied to a NAND gate 1006, thereby to deliver the output "1" when the condition of alternative appearance of the codes "0111" and "0001" is not satisfied. In FIG. 3(*b*), the waveforms indicated by the dotted lines show the case that the code errors from one level of the adjacent levels of the multilevel signal occur; the circle marks designate the cases where the insertion error occurs from "1000" to "0111"; and the cross marks designate the case where the deletion error occurs from "0111" to "0110".

Figure 5:
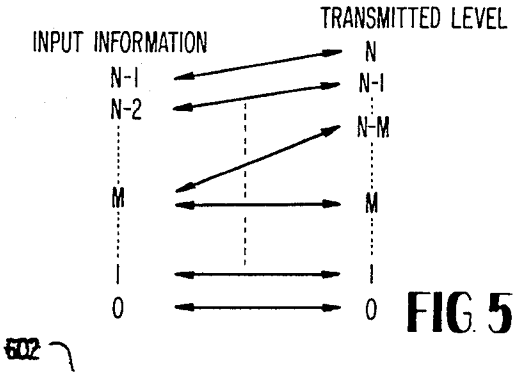
FIG. 5 shows a general relationship between pieces of input information and output levels.

In FIG. 5 is shown a diagramatic view for explaining the general method of converting N kinds of input codes into (N + 1) kinds of output codes to achieve the code error monitoring on the basis of the principle of the present invention. That is, the number of kinds of the input codes per unit symbol is N, the respective codes are numbered 0, 1, . . . , M, . . . and (N − 1), the number of kinds of the output codes is N + 1, and the respective codes are numbered 0, 1, . . . , M, . . . , (N − 1), and N. The M-th input code is associated with, for example, the M-th and (N—M)-th output codes as illustrated in FIG. 5, and the two output codes are alternately generated whenever the M-th input code appears.

Figure 6:
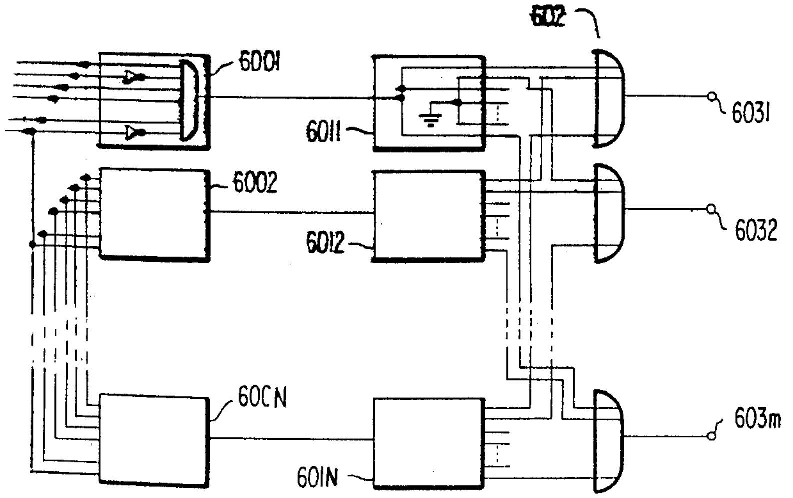
FIG. 6 is a circuit diagram of a generic embodiment of the present invention.

This code conversion can be realized by means of logic circuits such as the one shown generally in FIG. 6. FIG. 6 shows the code converter 1 or 11 in a generic form. The N input codes each consisting of *n* digit parallel binary code are applied to code detectors 6001 – 600N, each output of which assumes "1" upon receiving the corresponding code to be detected. For example, the output of the code detector 6001 assumes "1" when the input code is "1011 . . . 10". The outputs of the code detectors 6001 – 600N are applied to code generators 6011 – 601N generating N output codes each consisting of *m* digit parallel binary code. For example, the output of the code generator 6011 assumes "1010 . . . 01" when its input is "1". The *m* digit parallel binary codes are obtained at the output terminals 6031 – 603m through a logic circuit 602 provided with *m* OR gates, one for each digit. It is apparent that *m* is equal to *n* or *n*+l for the code converter 1 and that *m* is equal to *n* or *n*–l for the inverse converter 11.

The code detectors 2, 8 and 9 in FIGS. 1(*a*) and 1(*b*) may have the similar construction to the code detectors 6001 – 600N in FIG. 6.

From the fact that the code converter 4 or 7 should change a particular input code among the *m* digit binary codes to another particular *m* digit binary output codes responsive by to the control signal "1" from the control circuit 3 or code detector 8, it will be understood that the code converter 4 or 7 can be realized by applying only one or several digits, among the input codes, to be changed from one state to another, to exclusive OR circuits together with the control signal "1".

As the control circuit 3 and monitoring circuit 10, the circuits already shown in FIGS. 2(*a*) and 2(*b*) can be used as they are.

Thus, it is apparent that the present invention is applicable to the general code conversion as shown in FIG. 5. Since most of the code errors produced in the transmission line can be deemed to be errors between adjacent levels, the number of the possible transmission code errors amounts to 2(N − 1) by counting only the errors between adjacent levels. Therefore, the detection rate for the insertion errors to the two particular levels to be transmitted alternately is given by 4/2(N − 1), where N is an integer greater than three, and the detection rate for the disappearance errors from said particular levels is given by 4/2(N − 1) × (½) because the disappearance probability of each of the particular levels is one half that of each of the remaining levels. The total code error detection rate is therefore given by:

$$4/2(N-1)+\{4/2(N-1)\}\times(1/2)=3/(N-1)$$

This detection rate is obtained on condition that the two particular levels to be transmitted alternately are not the maximum or minimum levels among the *N* input levels and are not the adjacent levels to each other. In case where *N* is equal to 3, at least one of the two particular levels is set to be the maximum or minimum levels can be arranged not to be adjacent to each other. Therefore, the insertion errors to and the disappearance errors from the two particular levels can be completely detected (the total code error detection rate is 100%).

On the other hand, in case where a single vacant monitoring level is employed, only the insertion errors can be detected, and therefore, the error detection rate amounts to $2/2(N-1) = 1/(N-1)$. According to the present invention, errors can be detected at a rate 3 times as high as the detection rate in the aforementioned case.

What is claimed is:

1. A code error monitoring system for multi-level digital transmission systems capable of transmitting N kinds of input information in the form of multi-level digital signals, where N is an integer not smaller than 3, comprising:
   - means for converting said N kinds of input information into N corresponding binary input codes;
   - means for detecting a particular one of said binary input codes;
   - means for generating two particular binary output codes alternately whenever said particular input code is detected;
   - means for converting the remaining N—1 kinds of said binary input codes into N—1corresponding binary output codes; and
   - means for converting said two particular binary output codes and said N—1 binary output codes into corresponding multi-level digital signals; and on the receiving side,
   - means for regenerating said two particular binary output codes and said N—1 binary output codes;
   - means for detecting said two particular binary output codes and for providing an error detecting signal when one of said two particular binary output codes is continuously detected;
   - means for converting said regenerated two particular binary output codes and N—1 binary output codes into said N corresponding binary input codes; and
   - means for regenerating said input information said converted N binary input codes.

2. A digital transmission system capable of transmitting N binary input codes, where N is an integer not smaller than 3, comprising: on the transmitting side,
   - means for detecting a particular one of said N binary input codes;
   - means for providing at least two particular binary output codes in a predetermined sequence whenever said one particular binary input code is detected by said detecting means; and
   - means for converting the remaining N—1 binary input codes into corresponding binary output codes, whereby said N—1 corresponding binary output codes and said two particular binary output codes constitute an output having N+1 codes capable of being transformed into N+1 level digital signals and transmitted over a transmission medium; on the receiving side,
   - means for receiving said at least two particular binary output codes and said N—1 binary output codes; and
   - means for converting said received binary output codes into said N corresponding binary input codes.

3. The system according to claim 2, wherein said means for converting said received binary output codes includes:
   - means for detecting said at least two particular binary output codes; and
   - means for providing said one particular binary input code whenever said at least two particular binary output codes are detected.

4. The system according to claim 3, further comprising:
   - means responsive to said detecting means for monitoring to determine whether said at least two particular binary output codes appear in said predetermined sequence.

5. The system according to claim 4, wherein said monitoring means generates an error detection signal if the condition of said at least two particular binary output codes appearing in said predetermined sequence is not satisfied.

6. A code error monitoring system for a digital transmission system capable of transmitting N binary input codes, where N is an integer not smaller than three, said monitoring system comprising: on the transmitting side,
   - means for detecting a particular one of said N binary input codes;
   - means for converting the remaining N—1 binary input codes into corresponding binary output codes;
   - means for providing two particular binary output codes whenever said one particular binary input code is detected; and
   - means for converting said two particular binary output codes and said N—1 binary output codes into corresponding digital signals for transmission over a transmission medium; and on the receiving side,
   - means for deriving said two particular binary output codes and said N—1 binary output codes from the received digital signals;
   - means for detecting said two particular binary output codes;
   - means for providing said one particular input code whenever said two particular binary output codes are detected;
   - means for converting said N—1 binary output codes into said corresponding binary input codes; and
   - means for monitoring to determine whether said two particular binary output codes appear alternately and for providing an error detection signal if the condition of alternate appearance is not satisfied.

7. The system according to claim 6, wherein said binary output codes are represented by one more digit than said binary input codes.

8. The system according to claim 6, wherein neither of said two particular binary output codes is on the maximum or minimum transmission levels nor on the levels adjacent to each other.

9. The system according to claim 6, wherein said first-named detecting means includes:
   - an AND gate connected to produce an output upon reception of said one particular binary input code.

10. The system according to claim 6, wherein said first-named converting means includes:
   - an NAND gate connected to receive said binary input codes;
   - a plurality of AND gates connected to receive said binary input codes and the output of said NAND gate; and an inverter connected to receive the output of said NAND gate.

11. The system according to claim 6, wherein said means for providing two particular binary output codes includes:

first and second AND gates connected to receive the output of said first-named detecting means, said first AND gate being also connected to receive a first clock pulse;

a D-type flip-flop connected at its input to the output of said first AND gate and its output to said second AND gate; and at least one exclusive-OR gate connected to receive the output of said second AND gate and the output of said first-named converting means.

12. The system according to claim 6, wherein said last-named detecting means includes:

first and second NAND gates connected to produce an output upon reception of a first and second one of said two particular binary output codes, respectively.

13. The system according to claim 12, wherein said means for providing said one particular input code includes:

an inverter responsive to the output of said first NAND gate; and at least one exclusive-OR gate connected to receive the output of said inverter and the output of said means for deriving said two particular binary output codes and said N−1 binary output codes.

14. The system according to claim 12, wherein said monitoring means includes:

first and second differentiators responsive to the outputs of said first and second NAND gates, respectively, a flip-flop having two inputs connected to the outputs of said first and second differentiators;

first and second inverters responsive to the outputs of said first and second NAND gates, respectively;

third and fourth NAND gates responsive to the respective outputs of said flip-flop and to the outputs of said first and second inverters, respectively; and a fifth NAND gate responsive to the outputs of said third and fourth NAND gates.

15. A transmitter for use in a digital transmission system capable of transmitting N kinds of binary input codes, comprising:

means for detecting a particular one of said N binary input codes;

means for providing at least two particular binary output codes in a predetermined sequence whenever said one particular binary input code is detected; and means for converting the remaining N−1 binary input codes into corresponding binary output codes, whereby said N−1 corresponding binary output codes and said two particular binary output codes constitute an output having N+1 codes capable of being transformed into N+1 level digital signals and transmitted over a transmission medium.

16. A receiver for use in a digital transmission system in which at the transmitting station at least two particular different-level code signals are transmitted in a predetermined sequence in response to a particular one of N kinds of input information to be transmitted, with N −1 codes signals corresponding to the remaining N−1 kinds of input information, said receiver comprising:

means for receiving said at least two particular code signals and said N−1 code signals; and means for converting said received binary output codes into said N corresponding binary input codes.

17. The receiver according to claim 16, wherein said means for converting said received binary output codes includes:

means for detecting said at least two particular binary output codes; and means for providing said one particular binary input code whenever said at least two particular binary output codes are detected.

18. The receiver according to claim 17, further comprising:

means responsive to said detecting means for monitoring to determine whether said at least two particular binary output codes appear in said predetermined sequence.

19. The receiver according to claim 18, wherein said monitoring means generates an error detection signal if the condition of said at least two particular binary output codes appearing in said predetermined sequence is not satisfied.

* * * * *

UNITED STATES PATENT AND TRADEMARK OFFICE

CERTIFICATE OF CORRECTION

PATENT NO. : 3911395

DATED : October 7, 1975

INVENTOR(S) : Shin-Ichi Koike

It is certified that error appears in the above-identified patent and that said Letters Patent are hereby corrected as shown below:

IN THE SPECIFICATION:

Column 1, line 6 - insert hyphen (-) between "multi" and "level"
Column 2, line 32- after "input" insert --codes--
line 50 - delete "counting" and insert --converting--
Column 3, line 20- delete "8" and insert --converts--
line 27- after "001" insert a period --.--
line 50 - delete "Q" (second occurence) and insert --Q--
line 58- after "level" (first occurrence) delete "of" and insert --to--
Column 4, line 34- delete "responsive by" and insert --responsively--

IN THE CLAIMS:

Column 5, line 28- no space between "N-1" and "corresponding"
line 43- after "information" insert --from--
Column 7, line 11- after "and" insert --at--

Signed and Sealed this

*sixteenth* Day of *March 1976*

[SEAL]

*Attest:*

RUTH C. MASON
*Attesting Officer*

C. MARSHALL DANN
*Commissioner of Patents and Trademarks*